United States Patent Office 2,812,235
Patented Nov. 5, 1957

2,812,235

METHOD OF PURIFYING VOLATILE COMPOUNDS OF GERMANIUM AND SILICON

Field H. Winslow, Springdale, N. J., assignor to Bell Telephone Laboratories, Incorporated, New York, N. Y., a corporation of New York No Drawing. Application September 16, 1955, Serial No. 534,865

10 Claims. (Cl. 23—87)

This invention relates to a method for removing impurities from volatile compounds of semiconductor elements.

The silicon tetrachloride of commerce is commonly produced by the reaction of chlorine with silicon. The latter material, in turn, is most usually obtained by a high-temperature arc reduction of silicon dioxide with coke. The silicon so produced may contain as high as 1 percent to 2 percent of impurities, largely iron, aluminum, phosphorus, and boron. These impurities, at least in part, are converted to their respective chlorides when the silicon is reacted with chlorine to form silicon tetrachloride.

A considerable quantity of the chloride impurities so introduced into silicon tetrachloride may be subsequently removed by distillation of the volatile silicon compound. At normal pressures, the boiling point of silicon tetrachloride, a colorless fuming liquid, is 57.6° C.

For the removal of boron trichloride, particularly, which has a normal boiling point at 12.5° C., the discard of the first-boiling fractions of distilled silicon tetrachloride should give a product, largely from a middle fraction of the distillate, essentially free of boron contaminants.

By ordinary chemical standards such would be the case. If the silicon tetrachloride so purified is later reduced to the elemental metal, silicon, however, sufficient boron trichloride impurity may still remain in the distillate and be reduced with the silicon tetrachloride to interfere seriously with desirable electrical properties of the silicon. Such is particularly true if the silicon obtained in this manner is later used in the production of semiconductor devices. In the manufacture of such devices, notoriously only the most contaminant-free starting materials are usually desired, as extremely small impurity concentrations show large effects on semiconductor conductivity properties.

The present invention concerns a method for complexing the boron trichloride impurities found in silicon tetrachloride to form compounds with a high boiling point. Separation of the silicon tetrachloride, now relatively much more volatile than the complexed impurities, by distillation for example, yields silicon tetrachloride fractions of very low boron contaminant content. Silicon prepared by reduction of silicon tetrachloride distillates so treated prior to distillation has a lower concentration of boron impurities than does silicon heretofore prepared from untreated silicon tetrachloride.

The complexing agents most useful for "tying-up" boron trichloride contaminants in silicon tetrachloride are chlorotriphenylmethane, $(C_6H_5)_3CCl$, and fluorotriphenylmethane, $(C_6H_5)_3CF$. These compounds, which are insoluble or only slightly soluble in silicon tetrachloride, have melting and boiling points well above the normal boiling point of silicon tetrachloride. The relatively low vapor pressures of the compounds at the distillation temperatures usually used to remove the purified silicon tetrachloride ensure that the distillates will be essentially free of contamination from any unreacted excess of the complexing agent present.

Some properties of the complexes formed between boron trichloride and fluorotriphenylmethane and chlorotriphenylmethane respectively are briefly reviewed in the article of Donald Ray Martin in Chemical Reviews, volume 34, pages 461 through 471 at page 470, published in 1944.

The preferred practise of the invention will be described with reference to the use of chlorotriphenylmethane as the complexing agent. Using fluorotriphenylmethane, the principles and procedures of the invention follow the given exemplary illustration for chlorotriphenylmethane without significant change.

In the preferred practise of the purification process which is the subject of this invention, a small amount of chlorotriphenylmethane is allowed to contact the silicon tetrachloride to be purified. This is most easily done by adding solid chlorotriphenylmethane to the liquid and permitting the mixture to stand at room temperature. After opportunity for formation of the complex, which in the literature is reputed to have the formula

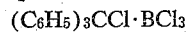

$(C_6H_5)_3CCl \cdot BCl_3$ the volatile liquid silicon tetrachloride is separated, as by distillation from the mixture, with or without decantation from any residual visible solid. What is important is the formation of the complex with boron trichloride. To this end, an excess of the complexing reagent is desirable, and a reasonable time should be allowed for the reaction of the complexing agent with the impurities to be complexed.

As the boron trichloride content of commercial grade silicon tetrachloride is small, by ordinary standards, only small quantities of the complexing agent are required to bring about complexing. Generally, at least a five-fold or ten-fold molar excess of complexing agent is maintained, over the amount of boron trichloride impurity estimated to be present in the sample being treated. Larger quantities of the complexing agent, though perhaps desirable as displacing equilibrium to favor formation of the complex, may not be practically feasible. The complexing agent may itself contain trace impurities tending to contaminate silicon tetrachloride. For this reason the concentration of the reagent is preferably kept as low as is consistent with efficient boron removal.

Though the quantity of boron trichloride impurity in a silicon tetrachloride sample is variable, an impurity content of about 0.005 weight percent, or 0.007 mole percent, is typical. Departures from this value may occur as the processes and raw materials used in silicon tetrachloride manufacture vary. Usually, for a 3000 gram charge of silicon tetrachloride to be distilled, 3 grams of chlorotriphenylmethane are added. Such a 3000 gram sample of silicon tetrachloride will, on the average, contain about one one-thousandth of a mole of boron trichloride. The 3 grams of chlorotriphenylmethane furnish about one one-hundredth of a mole of complexing agent. Such a ten-fold molar predominance of the complexing reagent over the impurities favorably displaces the equilibrium for complex formation toward essentially complete complexing.

Permitting the complexing agent to remain in the quiescent liquid overnight, or for about 16 hours, brings about a satisfactory attainment of equilibrium conditions. This is perhaps the most convenient equilibration process. If the silicon tetrachloride sample is continuously agitated by stirring or shaking, the equilibration, and complex formation, may be brought about in a shorter interval. Agitation probably serves principally to saturate the liquid with the only slightly soluble complexing agent.

The complex is most conveniently formed by reaction at room temperature. Though lower temperatures may favor the equilibrium formation of the complex, the complex is stable not only at room temperature but at temperatures greater than 50° C. The efficiency of separation by distillation of silicon tetrachloride from the complex at a temperature of nearly 60° C. shows the stability of the complex at this temperature. Since reaction at temperatures lower than room temperature may be accompanied by a reduced rate of attainment of equilibrium, and since separation of the volatile constituent of the reaction mixtures will most usually be done at room temperature or higher temperatures, no advantage in such a low-temperature equilibration is apparent.

After treatment with the complexing agent, separation of the purified silicon tetrachloride from the complexed impurities and from any excess of the complexing reagent is carried out. Distillation has proved an effective mode of separation. Usually a first-boiling fraction, 10 percent of the whole sample, is discarded. A liquid fraction of 10 percent is also usually left in the still along with any solid residue. The intermediate portion of the silicon tetrachloride is collected.

If the treated silicon tetrachloride is to be reduced to elemental silicon with hydrogen, a convenient separation may be made by bubbling hydrogen through the liquid tetrachloride containing the complex. The hydrogen becomes saturated with the volatile silicon tetrachloride, leaving the less volatile complex and unreacted complexing agent behind. The gas stream containing silicon tetrachloride vapors may then be passed over a hot wire to bring about the reduction reaction wanted, as taught in the article by Rudolf Hölbling in Zeitschrift für angewandte Chemie, volume 40, pages 655 through 659, 1927.

The distillation earlier mentioned, as well as the separation described just above can be carried out under reduced pressure if desired. The use of reduced pressures, and reduced temperatures in consequence, favors stability of the boron trichloride-chlorotriphenylmethane complex. The unusually high stability of the complex may make such additional precautions unnecessary however. As already mentioned, good separations can be made at temperatures as high as approximately 60° C., the normal boiling point of silicon tetrachloride.

The efficacy of the complexing treatment when followed by a distillation at normal pressures may be seen from the following analysis of a typical silicon tetrachloride sample treated with chlorotriphenylmethane as the complexing agent. For the analysis, done with an emission spectrograph, the liquid silicon tetrachloride samples were hydrolyzed. The resultant silicon dioxide was dried and used as the analytical sample. The "first fraction" and "still residue" each comprised about 10 percent of the total liquid sample treated. The molar ratio of chlorotriphenylmethane to the estimated boron trichloride content was 10 to 1 in the sample analyzed.

| Quantity | Approximate Concentration in Weight Percent | Impurity |
|---|---|---|
| First fraction: | | |
| Slight trace | less than 0.005 percent | Fe, Mg. |
| Very slight trace | less than 0.001 percent | Cu. |
| Product: | | |
| Slight trace | less than 0.005 percent | Cu, Fe, Mg. |
| Very slight trace | less than 0.001 percent | Na. |
| Still residue (liquid): | | |
| Minor | 0.1–3.0 percent | V. |
| Impurity | 0.1–0.3 percent | Ti. |
| Trace | less than 0.03 percent | Ge. |
| Slight trace | less than 0.005 percent | Al, Cu, Fe, Mg. |
| Very slight trace | less than 0.001 percent | Ca, Na. |
| Solid residue: | | |
| Major | greater than 1 percent | V. |
| Minor | 0.1–3.0 percent | Ti. |
| Impurity | 0.01–0.3 percent | Sn. |
| Trace | less than 0.03 percent | Al, B, Fe, Mg. |
| Slight trace | less than 0.005 percent | Ca, Cu, Na. |

As may be seen from the analysis, the boron is concentrated in the solid residue remaining after distillation. Similar silicon tetrachloride fractionations, without prior treatment with chlorotriphenylmethane, generally show boron to be present in the first distilled portions in concentrations of about 0.005 weight percent or "slight trace" quantities.

Though the method has been described as being of particular interest for removing boron trichloride impurities from silicon tetrachloride, it may be used to complex boron trichloride in other volatile materials. In the processing of semiconductor metals particularly, where high purity is a prime consideration, the method can be used to purify volatile compounds of silicon other than silicon tetrachloride, and can be used to remove boron from volatile germanium compounds, especially germanium tetrachloride. Those volatile compounds of semiconductor elements, which compounds boil below about 100° C. or 150° C., are most suitable for treatment with the processes described. Compounds with higher boiling points are both less efficiently separated from the high-boiling complex and are more easily separated from low-boiling boron trichloride without intermediate complex formation. The method may, for instance, be advantageously used to remove boron trichloride from: bromosilicane, $SiH_3Br$; bromotrichlorosilicane, $SiBrCl_3$; chlorosilicane, $SiH_3Cl$; dibromosilicane, $SiH_2Br_2$; dibromodichlorosilicane, $SiBr_2Cl_2$; dichlorosilicane, $SiH_2Cl_2$; tribromosilicane, $SiHBr_3$; trichlorosilicane, $SiHCl_3$; trichloroiodosilicane, $SiCl_3I$; disilicane, $Si_2H_6$; trisilicane, $Si_3H_8$; tetrasilicane, $Si_4H_{10}$; bromogermane, $GeH_3Br$; chlorogermane, $GeH_3Cl$; dibromogermane, $GeH_2Br_2$; dichlorogermane, $GeH_2Cl_2$; trichlorogermane, $GeHCl_3$; digermane, $Ge_2H_6$; and trigermane, $Ge_3H_8$.

What is claimed is:

1. The method of purifying volatile compounds, boiling below about 150° C., of those elements which are members of the class consisting of germanium and silicon, which method comprises contacting said volatile compounds with a substance which is a member of the class consisting of chlorotriphenylmethane and fluorotriphenylmethane, maintaining such contact until said substance and boron trichloride impurities in said volatile compounds react to form a complex, and then separating said volatile compounds from the complex.

2. The method as described in claim 1 for which said substance is chlorotriphenylmethane.

3. The method of removing boron trichloride from volatile compounds, boiling below about 100° C., of those elements which are members of the class consisting of germanium and silicon, which method comprises contacting said compounds with at least a ten-fold molar excess, over the molar content of boron trichloride therein, of a substance which is a member of the class consisting of chlorotriphenylmethane and fluorotriphenylmethane, maintaining such contact till complexing of boron trichloride by said substance is complete, and then separating said volatile compounds from the complex by distillation.

4. The method of purifying the volatile tetrachloride of an element which is a member of the class consisting of germanium and silicon, which method comprises contacting said volatile tetrachloride with a substance which is a member of the class consisting of chlorotriphenylmethane and fluorotriphenylmethane, maintaining such contact until said substance and boron trichloride impurities in said volatile tetrachloride react to form a complex, and then separating the volatile tetrachloride from the complex.

5. The method as described in claim 4, in which said substance is chlorotriphenylmethane.

6. The method of purifying silicon tetrachloride, which method comprises complexing boron trichloride impurities therein by the addition thereto of a substance which is a member of the class consisting of chlorotriphenylmethane and fluorotriphenylmethane, maintaining contact between said substance and said silicon tetrachloride until equilibrium is reached in the complexing reaction between said substance and boron trichloride, and then separating the purified silicon tetrachloride from the complex.

7. The method of purifying silicon tetrachloride, which method comprises complexing boron trichloride impurities therein by the addition thereto of at least a five-fold molar excess, over the molar boron trichloride impurities therein, of a substance which is a member of the class consisting of chlorotriphenylmethane and fluorotriphenylmethane, maintaining contact between said substance and said silicon tetrachloride until equilibrium is reached in the complexing reaction between said substance and boron trichloride, and then separating the silicon tetrachloride from the complex by distillation.

8. The method as described in claim 7, for which said added substance is chlorotriphenylmethane.

9. The method of purifying germanium tetrachloride, which method comprises complexing boron trichloride impurities therein by the addition thereto of at least a five-fold molar excess, over the molar boron trichloride impurities therein, of a substance which is a member of the class consisting of chlorotriphenylmethane and fluorotriphenylmethane, maintaining contact between said substance and said germanium tetrachloride for at least 16 hours, and than separating the germanium tetrachloride from the complex by distillation.

10. The method of purifying commercial grade silicon tetrachloride, which comprises complexing boron trichloride impurities therein by the addition of at least 3 parts by weight of chlorotriphenylmethane to 3000 parts by weight of said commercial grade silicon tetrachloride, causing the mixture to stand for at least 16 hours, and then distilling the silicon tetrachloride from the mixture.

References Cited in the file of this patent

UNITED STATES PATENTS

| | | |
|---|---|---|
| 2,400,874 | Burk | May 28, 1946 |
| 2,400,875 | Hughes et al. | May 28, 1946 |
| 2,550,985 | Finholt | May 1, 1951 |

FOREIGN PATENTS

| | | |
|---|---|---|
| 908,492 | Germany | Apr. 5, 1954 |